US012789509B2

(12) United States Patent
Schmadtke et al.

(10) Patent No.: US 12,789,509 B2
(45) Date of Patent: Nov. 10, 2026

(54) PROJECTION ASSEMBLY FOR A HEAD-UP DISPLAY (HUD) WITH P-POLARIZED RADIATION

(71) Applicant: SAINT-GOBAIN GLASS FRANCE, Courbevoie (FR)

(72) Inventors: Lisa Schmadtke, Würselen (DE); Stephan Gillessen, Alsdorf (DE); Jefferson Do Rosario, Aachen (DE); Jan Hagen, Bonn (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 854 days.

(21) Appl. No.: 18/043,727

(22) PCT Filed: Oct. 13, 2021

(86) PCT No.: PCT/EP2021/078276
§ 371 (c)(1),
(2) Date: Oct. 19, 2023

(87) PCT Pub. No.: WO2022/089939
PCT Pub. Date: May 5, 2022

(65) Prior Publication Data

US 2024/0269965 A1 Aug. 15, 2024

(30) Foreign Application Priority Data

Oct. 29, 2020 (EP) .................................... 20204532

(51) Int. Cl.
*B32B 17/10* (2006.01)
*C03C 17/36* (2006.01)
(Continued)

(52) U.S. Cl.
CPC .. *B32B 17/10229* (2013.01); *B32B 17/10036* (2013.01); *B32B 17/1011* (2013.01);
(Continued)

(58) Field of Classification Search
CPC ........ B32B 17/10036; B32B 17/10201; B32B 17/10229; B32B 17/10458; G02B 5/208; H04N 5/7491
(Continued)

(56) References Cited

U.S. PATENT DOCUMENTS

2007/0020465 A1* 1/2007 Thiel .................. C03C 17/3673 428/428
2017/0242247 A1* 8/2017 Tso ........................ G02B 27/01
(Continued)

FOREIGN PATENT DOCUMENTS

CA 3034559 A1 3/2018
CN 104267499 A 1/2015
(Continued)

OTHER PUBLICATIONS

International Search Report as issued in International Patent Application No. PCT/EP2021/078276, dated Dec. 14, 2021.
(Continued)

*Primary Examiner* — Jessica M Merlin
(74) *Attorney, Agent, or Firm* — CUSHMAN PARTNERS LLC

(57) ABSTRACT

A projection assembly for a head-up display (HUD) includes a windshield, including outer and inner panes joined to one another via a thermoplastic intermediate layer, with an HUD region; and a projector directed at the HUD region having a radiation predominantly p-polarized; and a reflection coating for reflecting p-polarized radiation. The reflection coating contains exactly one electrically conductive layer based on silver. The reflection coating below the electrically conductive layer includes a lower dielectric layer structure with a refractive index of at least 1.9. The reflection coating above the electrically conductive layer includes an upper dielectric layer structure with a refractive index of at least
(Continued)

Figure 1:
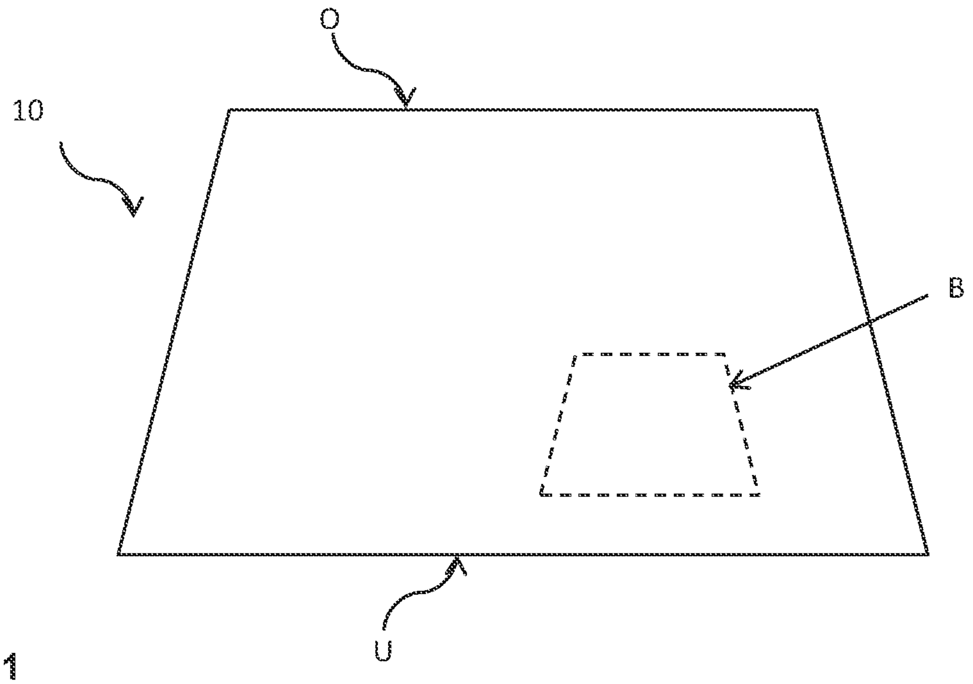

1.9. A functional coating for reflecting IR radiation and the reflection coating are arranged between the inner and outer panes. The reflection coating is arranged between the inner pane and the functional coating.

21 Claims, 3 Drawing Sheets

(51) Int. Cl.

| | |
|---|---|
| ***G02B 5/20*** | (2006.01) |
| ***G02B 27/00*** | (2006.01) |
| ***G02B 27/01*** | (2006.01) |

(52) U.S. Cl.

CPC .. *B32B 17/10201* (2013.01); *B32B 17/10449* (2013.01); *B32B 17/10458* (2013.01); *B32B 17/10651* (2013.01); *B32B 17/10761* (2013.01); *B32B 17/10779* (2013.01); *C03C 17/3618* (2013.01); *C03C 17/3626* (2013.01); *C03C 17/3639* (2013.01); *C03C 17/3644* (2013.01); *C03C 17/3649* (2013.01); *C03C 17/3657* (2013.01); *C03C 17/3681* (2013.01); *G02B 5/208* (2013.01); *G02B 27/0018* (2013.01); *G02B 27/0101* (2013.01); *B32B 2457/20* (2013.01); *B32B 2605/08* (2013.01); *C03C 2218/156* (2013.01)

(58) Field of Classification Search

USPC ...... 359/13–14, 629–633; 345/7–9; 348/115; 349/11

See application file for complete search history.

(56) References Cited

U.S. PATENT DOCUMENTS

| | | | | |
|---|---|---|---|---|
| 2019/0329529 | A1* | 10/2019 | Schulz | B32B 17/10174 |
| 2022/0206197 | A1* | 6/2022 | Tamura | G02B 5/208 |

FOREIGN PATENT DOCUMENTS

| | | | |
|---|---|---|---|
| CN | 106526854 | A | 3/2017 |
| CN | 106630688 | A | 5/2017 |
| CN | 111164492 | A | 5/2020 |
| CN | 111417516 | A | 7/2020 |
| CN | 111433023 | A | 7/2020 |
| CN | 111918853 | A | 11/2020 |
| EP | 1 880 243 | A2 | 1/2008 |
| EP | 1 800 855 | B1 | 2/2013 |
| EP | 3 187 917 | A2 | 7/2017 |
| WO | WO 2006/122305 | A2 | 11/2006 |
| WO | WO 2009/071135 | A1 | 6/2009 |
| WO | WO2020/043791 | A1 | 3/2020 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.tum.de/1079689?id=1079689&change_language=en>. (English abstract on p. 5 of document).

First Office Action as issued in Chinese Patent Application No. 202180003950.8, dated Oct. 25, 2025.

* cited by examiner

PROJECTION ASSEMBLY FOR A HEAD-UP DISPLAY (HUD) WITH P-POLARIZED RADIATION

CROSS-REFERENCE TO RELATED APPLICATIONS

This application is the U.S. National Stage of PCT/EP2021/078276, filed Oct. 13, 2021, which in turn claims priority to European patent application number 20204532.4 filed Oct. 29, 2020. The content of these applications are incorporated herein by reference in their entireties.

The invention relates to a projection assembly for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the driver's field of vision, for example, the current driving speed, navigation or warning messages, which the driver can perceive without having to take his eyes off the road. Head-up displays can thus contribute significantly to an increase in traffic safety.

HUD projectors are predominantly operated with s-polarized radiation and irradiate the windshield with an angle of incidence of about 65%, which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection assemblies that work with windshields without wedge films. For example, it is possible to operate the HUD projector with p-polarized radiation, which is not significantly reflected by the pane surfaces. Instead, the windshield has a reflection coating as a reflection surface for the p-polarized radiation. EP3187917A2 discloses such an HUD projection assembly that is operated with p-polarized radiation. Proposed, among other things, as a reflecting structure is a single metallic layer that is embedded between two dielectric layers, wherein the metallic layer is arranged between the two individual panes of the windshield. Alternatively, the metallic layer can also be arranged in combination with a polymer layer on an outer face of the windshield.

There is a need for windshields that have other functions in addition to the function as a reflection surface for p-polarized radiation. In this regard, heatable coatings or IR-radiation-reflecting coatings have particular significance. It is possible to use the reflection coating itself as a heatable coating, as disclosed, for example, in CN 106526854. However, it is difficult to combine both functions in one coating.

CN 106630688 discloses a composite pane having a reflection coating for p-polarized radiation on the face of the inner pane facing the vehicle interior and a low-E coating on the face of the outer pane facing the thermoplastic intermediate layer. A disadvantage of this configuration is that the reflection coating for p-polarized radiation is exposed and must be protected against mechanical damage by additional coatings.

There is a need for projection assemblies for HUDs having reflection coatings that ensure high transmittance in the visible spectral range and have high reflectivity for p-polarized radiation and, at the same time, provide improved thermal comfort. The object of the present invention is to provide such an improved projection assembly.

The object of the present invention is accomplished according to the invention by a projection assembly in accordance with claim 1. Preferred embodiments are apparent from the dependent claims.

According to the invention, p-polarized radiation is used for generating the HUD image, and the composite pane has a reflection coating that sufficiently reflects p-polarized radiation. Since the angle of incidence of about 65° typical for HUD projection assemblies is relatively close to Brewster's angle for an air/glass transition (56.5°, soda lime glass), p-polarized radiation is hardly reflected by the pane surfaces, but instead primarily by the conductive coating. Consequently, ghost images do not occur or are hardly perceptible such that the use of an expensive wedge film can be dispensed with. In addition, the HUD image is recognizable even for wearers of polarization-selective sunglasses, which typically allow only p-polarized radiation to pass through and block s-polarized radiation. The reflection coating according to the invention is responsible for high reflectivity for p-polarized radiation in the spectral range from 450 nm to 650 nm, which is relevant for HUD displays (HUD projectors typically operate at wavelengths of 473 nm, 550 nm, and 630 nm (RGB)). This results in a high-intensity HUD image. The single silver layer does not excessively reduce light transmittance such that the pane can still be used as a windshield. The functional coating provides for a significant improvement of the sun protection function of the pane by reflecting the sun's infrared (IR) radiation. At the same time, due to its arrangement inside the windshield, the functional coating is protected against mechanical damage. The same protective effect is achieved for the reflection coating since it is likewise arranged in the interior of the windshield. The arrangement of the reflection coating between the inner pane and the functional coating ensures that the p-polarized radiation of the projector is reflected primarily by the reflection coating, in order to then produce a clear HUD image for the viewer. Thus, there are no distracting reflections on the electrically conductive layers of the functional coating.

The projection assembly according to the invention for a head-up display (HUD) includes at least a windshield, which is provided with a reflection coating, and a projector. As is usual with HUDs, the projector irradiates a region of the windshield where the radiation is reflected in the direction of the viewer (driver), generating a virtual image, which the viewer perceives, from his perspective, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by readjustment of the mirrors, with the entire region thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used here from the field of HUDs are generally known to the person skilled in the art. For a detailed presentation, reference is made to Alexander Neumann's dissertation "Simulation-Based Metrology for the Testing of Head-Up Displays" at the Institute of Computer Science at the Technical University of Munich (Munich: University Library of the Technical University of Munich, 2012), in particular Chapter 2 "The Head-Up Display".

The windshield comprises an outer pane and an inner pane that are joined to one another via a thermoplastic intermediate layer. The windshield is intended, in a window opening of a vehicle to separate the interior from the external surroundings. In the context of the invention, the term "inner pane" refers to the pane of the windshield facing the vehicle interior. The term "outer pane" refers to the pane facing the external surroundings. The windshield is preferably the windshield of a motor vehicle, in particular of a passenger car or a truck.

The windshield has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface (outer face) and an interior-side surface (inner face) and a peripheral side edge extending therebetween. In the context of the invention, "exterior-side surface" or "outer face" refers to that primary surface that is intended, in the installed position, to face the external surroundings. In the context of the invention, "interior-side surface" or "inner face" refers to that primary surface that is intended, in the installed position, to face the interior. The interior-side surface or the inner face of the outer pane and the exterior-side surface or the "outer face" of the inner pane face each other and are joined to one another by the thermoplastic intermediate layer.

The projector is directed at the HUD region of the windshield. The radiation of the projector is predominantly p-polarized. The reflection coating is suitable for reflecting p-polarized radiation. As a result, a virtual image which the driver of the vehicle can perceive as behind the windshield from his perspective is generated from the projector radiation.

The reflection coating according to the invention has exactly one electrically conductive layer based on silver. A lower dielectric layer structure is arranged below the electrically conductive layer. The lower dielectric layer structure can consist of a single dielectric layer or comprise a layer sequence of multiple layers. An upper dielectric layer structure is also arranged above the electrically conductive layer. The upper dielectric layer structure can consist of a single dielectric layer or comprise a layer sequence of multiple dielectric layers. The upper and the lower dielectric layer structure have in each case a refractive index that is at least 1.9.

In the context of the present invention, refractive indices are, in principle, indicated in relation to a wavelength of 550 nm. The refractive index can, for example, be determined by ellipsometry. Ellipsometers are commercially available, for example, from the company Sentech. The refractive index of an upper or lower dielectric layer is preferably determined by first depositing it on a substrate as a single layer and then measuring the refractive index by ellipsometry. To determine the refractive index of an upper or lower dielectric layer sequence, the layers of the layer sequence are in each case deposited alone as single layers on a substrate and then the refractive index is determined by ellipsometry. According to the invention, a refractive index of at least 1.9 must be achieved for each of these individual layers.

In the case of a layer sequence with a refractive index of at least 1.9, all the individual layers thus have a refractive index of at least 1.9. Dielectric layers with a refractive index of at least 1.9 as well as methods for their deposition are known to the person skilled in the art in the field of thin films. Preferably, methods of physical vapor deposition, in particular magnetron sputtering, are used. The optical thickness is the product of the geometric thickness and the refractive index (at 550 nm). The optical thickness of a layer sequence is calculated as the 5 sum of the optical thicknesses of the individual layers.

In the context of the invention, if a first layer (or layer sequence, layer module, or layer structure) is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer.

When a layer is based on a material, the layer consists for the most part of this material, in particular substantially of this material in addition to any impurities or dopants.

The reflection coating is transparent, meaning, in the context of the invention, that it has average transmittance in the visible spectral range of at least 70%, preferably at least 80%, and thus does not substantially restrict vision through the pane. In principle, it suffices for the HUD region of the windshield to be provided with the reflection coating. However, other regions can also be provided with the reflection coating and the windshield can be provided 20 with the reflection coating essentially over its entire surface, which may be preferred for manufacturing reasons. In one embodiment of the invention, at least 80% of the pane surface is provided with the reflection coating according to the invention. In particular, the reflection coating is applied to the pane surface over its entire surface with the exception of a peripheral edge region and, optionally, local regions intended to ensure the transmittance of electromagnetic radiation through the windshield as communication windows, sensor windows, or camera windows, and, consequently, not provided with the reflection coating. The peripheral uncoated edge region has, for example, a width of up to 20 cm. It prevents direct contact of the reflection coating with the surrounding atmosphere such that the reflection coating is protected, inside the windshield, against corrosion and damage.

The functional coating has IR-reflecting properties such that it functions as a sun protection coating that reduces the heating of the vehicle interior by reflecting thermal radiation. The TTS value of the composite pane provided with the coating is preferably less than 60%, particularly preferably less than 55%. TTS value refers to the total solar energy transmitted, measured in accordance with ISO 13837-it is a measure of thermal comfort. The coating can also be used as a heating coating when it is electrically contacted such that a current flows through it, heating the reflection coating. The sheet resistance of the coating is preferably less than 4 Ω/square, in particular less than 3Ω/square.

The reflection coating is preferably applied directly on the surface of the inner pane facing the thermoplastic intermediate layer, i.e., the exterior-side surface (the outer face) of the inner pane. The arrangement directly on the outer face of the inner pane instead of attachment via a carrier film has the advantage that there are no optical impairments due to a carrier film. An optically flawless arrangement is particularly important for later use in the HUD projection assembly. Preferably, the reflection coating is applied by physical vapor deposition. This provides particularly good coatings and can be readily implemented industrially.

The functional coating is preferably arranged directly on the inner face of the outer pane facing the thermoplastic intermediate layer. The arrangement on the inner face of the outer pane prevents excessive heating of the pane. Particularly preferably, the functional coating is applied on the outer pane by physical vapor deposition. This provides particularly good coatings and can be readily implemented industrially.

Preferably, the functional coating is arranged directly on the inner face of the outer pane, and the reflection coating is arranged directly on the outer face of the inner pane. This is particularly easy to produce industrially since no separate carrier film has to be inserted. In addition, optical defects that occur during lamination of the windshield are avoided.

Also, preferably, the functional coating or the reflection coating is arranged on a polymeric carrier film. The carrier film is arranged between the outer pane and the inner pane. Preferably, the carrier film is embedded in the thermoplastic intermediate layer. Thus, an optimum bond between the inner pane and the outer pane is achieved.

Preferably, the reflection coating is arranged directly on the inner pane and the functional coating is embedded in the thermoplastic intermediate layer on a carrier film. Thus, optical impairments due to the carrier film or the thermoplastic intermediate layer are avoided during the generation of the HUD image.

Preferably, the functional coating and the reflection coating are applied to a carrier film, particularly preferably, to a single polymeric carrier film that contains the functional coating on one face and the reflection coating on the other face. This is advantageous from a process technology standpoint because only one single film has to be laminated in. In addition, in this case, the distance between the reflection coating and the functional coating is determined by only the thickness of the polymeric carrier film. When the p-polarized radiation is reflected at the functional coating, the resulting image is superimposed with the reflection at the reflection coating such that two separate HUD images are not perceived. Thus, distracting ghost images are efficiently suppressed.

The carrier film is preferably made substantially of polyethylene terephthalate (PET).

The thickness of the carrier film is preferably between 30 μm and 400 μm, more preferably between 40 μm and 200 μm, particularly preferably between 50 μm and 150 μm, for example, 100 μm. This is particularly advantageous in the case of a carrier film coated on both sides since double images that occur due to reflection at the functional coating and the HUD images are superimposed to form a single image such that no distracting double images are perceived.

In a preferred embodiment, the functional coating includes at least one electrically conductive layer based on silver. The geometric thickness of the electrically conductive layer in the functional coating is smaller than the geometric thickness of the electrically conductive layer based on silver in the reflection coating. Due to the smaller geometric thickness of the electrically conductive layer based on silver in the functional coating, which is smaller than the thickness of the electrically conductive layer in the reflection coating, high transmittance of the windshield is ensured and generation of a clear HUD image is achieved.

Preferably, the difference is 1 nm to 10 nm, preferably 2 nm to 6 nm, particularly preferably 3 nm to 4 nm. In the case of multiple electrically conductive layers in the functional coating, the difference refers in each case to the difference between a single layer of the functional coating and the layer in the reflection coating. Due to the smaller thickness of the electrically conductive layers in the functional coating, adequate transmittance of the windshield can be ensured. In addition, weak double images caused by the functional coating are only slightly pronounced.

The functional coating preferably includes at least one electrically conductive layer based on silver. A lowest dielectric layer module is arranged below the electrically conductive layer. The lowest dielectric layer module can consist of a single dielectric layer or comprise a layer sequence of multiple layers. Likewise, an uppermost dielectric layer module is arranged above the electrically conductive layer. The uppermost dielectric layer module can consist of a single dielectric layer or comprise a layer sequence of multiple dielectric layers. The uppermost and the lowest dielectric layer module have in each case a refractive index that is at least 1.9. The terms "uppermost" and "lowest" layer module mean, respectively, that in the functional coating, no further dielectric layer module is arranged above the uppermost layer module and no further dielectric layer module is arranged below the lowest dielectric layer module.

In a preferred embodiment, the functional coating includes at least one electrically conductive layer based on silver. The geometric thickness of the electrically conductive layer in the functional coating is smaller than the geometric thickness of the electrically conductive layer based on silver in the reflection coating. Due to the smaller geometric thickness of the electrically conductive layer based on silver in the functional coating, which is smaller than the thickness of the electrically conductive layer in the reflection coating, high transmittance of the windshield is ensured and generation of a clear HUD image is achieved. The functional coating preferably includes at least one electrically conductive layer based on silver. A lowest dielectric layer module is arranged below the electrically conductive layer. The lowest dielectric layer module can consist of a single dielectric layer or comprise a layer sequence of multiple layers. Likewise, an uppermost dielectric layer module is arranged above the electrically conductive layer. The uppermost dielectric layer module can consist of a single dielectric layer or comprise a layer sequence of multiple dielectric layers. The uppermost and the lowest dielectric layer module have in each case a refractive index that is at least 1.9.

The functional coating preferably has IR-reflecting properties due to the electrically conductive silver layer/layers such that it functions as a sun protection coating that reduces the heating of the vehicle interior by reflecting thermal radiation. The functional coating is preferably also used as a heating coating by electrically contacting it such that a current flows through it, heating the functional coating. In this case, the functional coating is connected to a voltage source via electrical bus bars and can be heated by applying a voltage.

The functional coating is transparent, meaning, in the context of the invention, that it has average transmittance in the visible spectral range of at least 70%, preferably at least 80%, and thus does not substantially restrict vision through the pane. The windshield is preferably provided with the functional coating essentially over its entire surface. Thus, a full-surface sun protection function is obtained and it is preferred for manufacturing reasons. In one embodiment of the invention, at least 80% of the pane surface is provided with the functional coating. Particularly preferably, the functional coating is applied to the pane surface over its entire area with the exception of a peripheral edge region, and, optionally, a local region intended to ensure the transmittance of electromagnetic radiation through the windshield as communication windows, sensor windows, or camera windows and, consequently, not provided with the functional coating. The peripheral uncoated edge region has, for example, a width of up to 20 cm. It prevents direct contact of the functional coating with the surrounding atmosphere such that the functional coating is protected, inside the windshield, against corrosion and damage.

In a preferred embodiment, in the reflection coating, the ratio of the optical thickness of the upper dielectric layer structure to the optical thickness of the lower dielectric layer structure is at least 1.6. It has surprisingly been shown that this asymmetry of the optical thicknesses results in a significantly smoother reflection spectrum for p-polarized radiation such that there is relatively constant reflectance over the entire relevant spectral range (400 nm to 680 nm). This ensures a color-neutral display of the HUD projection. Particularly preferably, the ratio of the optical thickness of the upper dielectric layer structure to the optical thickness of the lower dielectric layer structure is at least 1.7, particularly preferably at least 1.8. Particularly good results are thus achieved.

The ratio of the optical thicknesses is calculated as the quotient of the optical thickness of the upper dielectric layer structure (dividend) divided by the optical thickness of the lower dielectric layer structure (divisor).

In a preferred embodiment, in the functional coating, the ratio of the optical thickness of the uppermost dielectric layer module to the optical thickness of the lowest dielectric layer module is between 0.8 and 2. It has surprisingly been shown that this ratio results in particularly high transmittance values for the windshield. Preferably, the ratio of the optical thickness of the uppermost dielectric layer module to the optical thickness of the lowest dielectric layer module is between 0.8 and 1.5, particularly preferably between 0.9 and 1.2, and in particular about 1.0. Particularly good transmittance properties are thus achieved.

The ratio of the optical thicknesses is calculated as the quotient of the optical thickness of the uppermost dielectric layer module (dividend) divided by the optical thickness of the lowest dielectric layer module (divisor).

In a preferred embodiment, the functional coating contains two electrically conductive layers based on silver and a middle dielectric layer module therebetween. This improves the IR-reflecting properties such that an improved thermal protection effect is achieved. The middle dielectric layer module is arranged between the two conductive layers based on silver such that the functional coating contains the following layers in this order: lowest dielectric layer module—first conductive layer based on silver—middle dielectric layer module—second conductive layer based on silver—uppermost dielectric layer module. The layer stack can include other layers.

Preferably, in the functional coating, the ratio of the optical thickness of the middle dielectric layer module to the optical thickness of the lowest dielectric layer module and to the optical thickness of the uppermost dielectric layer module is greater than 1.9, particularly preferably greater than 2.0, and, in particular, preferably greater than 2.1. The inventors have found that this ratio results in surprisingly high values in the transmittance of the windshield despite the increased number of silver layers. Preferably, the ratio is not greater than 3.0.

Thus, this concerns the following ratios of optical thicknesses:

- middle dielectric layer module/lowest dielectric layer module,
- middle dielectric layer module/uppermost dielectric layer module, Preferably, in the functional coating, the ratio of the optical thickness of the uppermost dielectric layer module to the optical thickness of the lowest dielectric layer module is between 0.9 and 1.1, preferably about 1, and the ratio of the optical thickness of the middle dielectric layer module to the optical thickness of the lowest dielectric layer module and to the optical thickness of the uppermost dielectric layer module is greater than 1.9, particularly preferably greater than 2.0, and, in particular, preferably greater than 2.1. This combination leads to particularly good results.

In another preferred embodiment, the functional coating contains three electrically conductive layers based on silver and two middle dielectric layer modules that are arranged between the three electrically conductive layers based on silver. This further improves the IR-reflecting properties such that an increased thermal protection effect is achieved. The two middle dielectric layer modules are arranged such that, in each case, a middle dielectric layer module is arranged between two silver layers. Thus, the functional coating contains the following layers in this order: lowest dielectric layer module—first conductive layer based on silver—middle dielectric layer module—second conductive layer based on silver—middle dielectric layer module—third conductive layer based on silver—uppermost dielectric layer module. The layer stack can also include further layer stacks. The presence of more than three electrically conductive layers based on silver is also possible, in which case further middle dielectric layer modules are added such that the silver layers are in each case isolated from one another by a dielectric layer module.

Preferably, in the functional coating, the ratios of the optical thickness of the two middle dielectric layer modules to the optical thickness of the lowest dielectric layer module and the optical thickness of the uppermost dielectric layer module are greater than 1.9, preferably greater than 2.0, particularly preferably greater than 2.1. Thus, this concerns the following ratios of optical thicknesses:

- first middle dielectric layer module/lowest dielectric layer module,
- second middle dielectric layer module/lowest dielectric layer module,
- first middle dielectric layer module/uppermost dielectric layer module,
- second middle dielectric layer module/uppermost dielectric layer module.

Preferably, in this case, in the functional coating, the ratio of the optical thickness of the uppermost dielectric layer module to the optical thickness of the lowest dielectric layer module is between 0.9 and 1.1, preferably about 1, and the ratio of the optical thickness of the middle dielectric layer module to the optical thickness of the lowest dielectric layer module and to the optical thickness of the uppermost dielectric layer module is greater than 1.9, particularly preferably greater than 2.0 and, in particular, preferably greater than 2.1. This combination leads to particularly good results.

In another preferred embodiment, the functional coating contains at least two, preferably exactly two, exactly three, or exactly four electrically conductive layers based on silver, with each electrically conductive layer based on silver in the functional coating having a thinner geometric thickness than the electrically conductive layer based on silver in the reflection coating. This results in an improved thermal protection effect of the windshield with, at the same time, high transmittance, with no distracting ghost images created by reflection at the conductive layers of the functional coating.

The reflection coating is a thin-layer stack, i.e., a layer sequence of thin individual layers. This thin-layer stack contains exactly one electrically conductive layer based on silver. The electrically conductive layer based on silver gives the reflection coating the basic reflecting properties and also an IR-reflecting effect and electrical conductivity. The electrically conductive layer based on silver can also be referred to simply as a silver layer. The reflection coating contains exactly one silver layer, i.e., not more than one silver layer. It is a particular advantage of the present invention that the desired reflection properties can be achieved with one silver layer without excessively reducing the transmittance, as would be the case if multiple conductive layers were used in the reflection coating. However, it is also possible for other electrically conductive layers to be present that do not substantially contribute to the electrical conductivity of the reflection coating but serve a different purpose. This applies in particular to metallic blocking layers with geometric thicknesses less than 1 nm, which are preferably arranged between the silver layer and the dielectric layer structures.

The electrically conductive layers in the functional coating and in the reflection coating are based on silver. The conductive layers preferably contain at least 90 wt.-% silver, particularly preferably at least 99 wt.-% silver, most particularly preferably at least 99.9 wt.-% silver. The silver layers can have dopants, for example, palladium, gold, copper, or aluminum.

The geometric layer thickness of the silver layer in the reflection coating is preferably at most nm, particularly preferably at most 14 nm, most particularly preferably at most 13 nm. As a result, advantageous reflectivity is achieved without excessively reducing transmittance. The geometric layer thickness of the silver layer is preferably at least 5 nm, particularly preferably at least 8 nm. Thinner silver layers can lead to dewetting of the layer structure. Particularly preferably, the geometric layer thickness of the silver layer is from 10 nm to 14 nm or from 11 nm to 13 nm.

The geometric layer thickness of the individual silver layers in the functional coating is preferably at most 12 nm, particularly preferably at most 10 nm, particularly preferably about 8 nm. This results in high reflectivity in the IR range without excessively reducing transmittance.

In an advantageous embodiment, the reflection coating includes no dielectric layers whose refractive index is less than 1.9. In other words, all dielectric layers of the reflection coating have a refractive index of at least 1.9. It is a particular advantage of the present invention that the desired reflection properties can be achieved with relatively high-refractive-index dielectric layers alone. Since silicon oxide layers that have low deposition rates in magnetron enhanced cathodic deposition are, in particular, considered for low-refractive-index layers with a refractive index of less than 1.9, the reflection coating according to the invention can thus be produced quickly and economically.

In an advantageous embodiment, the functional coating includes no dielectric layers whose refractive index is less than 1.9. In other words, all dielectric layers of the functional coating have a refractive index of at least 1.9. It is a particular advantage that low-refractive-index layers with a refractive index of less than 1.9 (in particular silicon oxide layers) are not required since these have low deposition rates in magnetron enhanced cathodic sputtering. Thus, the windshield according to the invention can be produced quickly and economically.

Preferably, the functional coating and the reflection coating include no dielectric layers whose refractive index is less than 1.9.

The reflection coating contains, above and below the silver layer, independently of one another in each case, a dielectric layer structure with a refractive index of at least 1.9. The dielectric layers contained in the dielectric layer structure can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron. Layers of these materials with a refractive index of at least 1.9 are known per se in the form of individual layers and are accessible to the person skilled in the art via known methods. Preferably, physical vapor deposition methods, in particular magnetron sputtering, are used to deposit these layers.

The optical thickness of the upper dielectric layer structure is preferably from 80 nm to 200 nm, particularly preferably from 100 nm to 130 nm. The optical thickness of the lower dielectric layer structure is preferably from 50 nm to 100 nm, particularly preferably from 60 nm to 90 nm. Good results are achieved with this.

In an advantageous embodiment, a dielectric layer, which can be referred to as an antireflection layer and is preferably based on an oxide, for example, tin oxide, and/or a nitride, for example, silicon nitride, particularly preferably based on silicon nitride, is, in each case, arranged in the reflection coating above and below the silver layer. Silicon nitride has proven to be a good choice due to its optical properties, its easy availability, and its high mechanical and chemical stability. The silicon is preferably doped, for example, with aluminum or boron. In the case of dielectric layer sequences, the silicon nitride based layer is preferably the uppermost layer of the upper layer sequence or the lowest layer of the lower layer sequence. The geometric thickness of the upper antireflection layer is preferably from 20 nm to 100 nm, particularly preferably from 40 nm to 60 nm, in particular from 30 nm to 50 nm. The geometric thickness of the lower antireflection layer is preferably from 10 nm to 50 nm, particularly preferably from 15 nm to 40 nm, in particular from 20 nm to 35 nm.

In addition to the antireflection layer, further dielectric layers with a refractive index of at least 1.9 can optionally be present in the dielectric layer structure. Thus, the upper dielectric layer structure and the lower dielectric layer structure can, independently of one another, contain a matching layer to improve the reflectivity of the silver layer. The matching layers are preferably based on zinc oxide, particularly preferably zinc oxide $ZnO_{1-\delta}$ with $0 \leq \delta \leq 0.01$. The matching layers further preferably contain dopants. The matching layers can, for example, contain aluminum-doped zinc oxide (ZnO:Al). The zinc oxide is preferably deposited substoichiometrically in terms of oxygen in order to avoid reaction of excess oxygen with the silver-containing layer. The matching layers are preferably arranged between the silver layer and the antireflection layer. The geometric thickness of the matching layer is preferably from 5 nm to 30 nm, particularly preferably from 8 nm to 12 nm.

Refractive-index-enhancing layers that have a higher refractive index than the antireflection layer can also be present in the reflection coating, likewise independently of one another, in the upper dielectric layer structure and the lower dielectric layer structure. This can further improve and fine-tune the optical properties. The refractive-index-enhancing layers preferably contain a mixed silicon-metal nitride, such as mixed silicon-zirconium nitride, mixed silicon-aluminum nitride, mixed silicon-titanium nitride, or mixed silicon-hafnium nitride, particularly preferably mixed silicon-zirconium nitride. The proportion of zirconium is preferably between 15 and 45 wt.-%, particularly preferably between 15 and 30 wt.-%. Alternative materials can be, for example, $WO_3$, $Nb_2O_5$, $Bi_2O_3$, $TiO_2$, and/or AlN. The refractive-index-enhancing layers are preferably arranged between the antireflection layer and the silver layer or between the matching layer (if present) and the antireflection layer. The geometric thickness of the refractive-index-enhancing layer is preferably from 5 nm to 30 nm, particularly preferably from nm to 15 nm.

In a preferred embodiment of the invention, exactly one lower dielectric layer with a refractive index of at least 1.9, preferably based on silicon nitride, is arranged in the reflection coating below the electrically conductive layer. This means that the lower dielectric layer structure consists of exactly one lower dielectric layer. Likewise, exactly one upper dielectric layer with a refractive index of at least 1.9, preferably based on silicon nitride, is arranged above the electrically conductive layer. This means that the upper dielectric layer structure consists of exactly one upper dielectric layer. This results in the layer sequence, starting from the substrate: lower antireflection layer—silver layer—upper antireflection layer. The reflection coating preferably does not contain any other dielectric layers. The geometric thickness of the upper antireflection layer is preferably from 20 nm to 100 nm, particularly preferably from nm to 60 nm, in particular from 30 nm to 50 nm. The geometric thickness of the lower antireflection layer is preferably from 10 nm to 50 nm, particularly preferably from 15 nm to nm, in particular from 20 nm to 35 nm.

In another preferred embodiment of the invention, a first lower dielectric layer (antireflection layer) and a second lower dielectric layer (matching layer) are arranged in the reflection coating below the electrically conductive layer. This means that the lower layer structure includes a first lower dielectric layer and a second lower dielectric layer. Likewise, a first upper dielectric layer (antireflection layer) and a second upper dielectric layer (matching layer) are arranged above the electrically conductive layer. This means that the upper layer structure includes or consists of a first upper dielectric layer and a second upper dielectric layer. The antireflection and matching layers have a refractive index of at least 1.9. The antireflection layers are preferably based on silicon nitride; the matching layers, on zinc oxide. The matching layers are preferably arranged between the respective antireflection layer and the silver layer: This results in the layer sequence, starting from the substrate: lower antireflection layer—lower matching layer—silver layer—upper matching layer—upper antireflection layer. The reflection coating preferably does not contain any other dielectric layers. The geometric thickness of the upper antireflection layer is preferably from 20 nm to 100 nm, particularly preferably from 40 nm to 60 nm, in particular from 30 nm to 50 nm. The geometric thickness of the lower antireflection layer is preferably from 10 nm to 50 nm, particularly preferably from nm to 40 nm, in particular from 20 nm to 35 nm.

The geometric thickness of the matching layers is preferably from 5 nm to 30 nm, particularly preferably from 8 nm to 12 nm.

In another embodiment of the invention, a first lower dielectric layer (antireflection layer), a second lower dielectric layer (matching layer), and a third lower dielectric layer (refractive-index-enhancing layer) are arranged in the reflection coating below the electrically conductive layer. This means that the lower layer structure includes or consists of a first lower dielectric layer, a second lower dielectric layer, and a third lower dielectric layer. Likewise, a first upper dielectric layer (antireflection layer), a second upper dielectric layer (matching layer), and a third upper dielectric layer (refractive-index-enhancing layer) are arranged above the electrically conductive layer. This means that the upper layer structure includes or consists of a first upper dielectric layer, a second upper dielectric layer, and a third upper dielectric layer.

The antireflection and matching layers and the refractive-index-enhancing layers have a refractive index of at least 1.9. The refractive-index-enhancing layers have a higher refractive index than the antireflection layers, preferably at least 2.1. The antireflection layers are preferably based on silicon nitride; the matching layers, based on zinc oxide; the refractive-index-enhancing layers, based on a mixed silicon-metal nitride, such as mixed silicon-zirconium nitride or mixed silicon-hafnium nitride. The matching layers preferably have the least distance from the silver layer, while the refractive-index-enhancing layers are arranged between the matching layers and the antireflection layers. This results in the layer sequence, starting from the substrate: lower antireflection layer—lower refractive-index-enhancing layer—lower matching layer—silver layer—upper matching layer—upper refractive-index-enhancing layer—upper antireflection layer. The reflection coating preferably does not contain any other dielectric layers. The geometric thickness of the upper antireflection layer is preferably from 20 nm to 100 nm, particularly preferably from 40 nm to 60 nm, in particular from 30 nm to 50 nm. The geometric thickness of the lower antireflection layer is preferably from 10 nm to 50 nm, particularly preferably from 15 nm to 40 nm, in particular from 20 nm to nm. The geometric thickness of the matching layers is preferably from 5 nm to 30 nm, particularly preferably from 8 nm to 12 nm. The geometric thickness of the refractive-index-enhancing layers is preferably from 5 nm to 30 nm, particularly preferably from 5 nm to 15 nm.

Since the lower layer structure and the upper layer structure can be formed independently of one another, combinations of the above described embodiments are also possible, wherein the upper dielectric layer structure is formed according to one embodiment and the lower dielectric layer structure is formed according to a different one. This results in the following preferred layer sequences (in each case, starting from the substrate, i.e., the surface on which the reflection coating is deposited:

- lower antireflection layer—silver layer—upper antireflection layer
- lower antireflection layer—silver layer—upper matching layer—upper antireflection layer
- lower antireflection layer—silver layer—upper matching layer—upper refractive-index-enhancing layer—upper antireflection layer
- lower antireflection layer—lower matching layer—silver layer—upper antireflection layer

- lower antireflection layer—lower matching layer—silver layer—upper matching layer—upper antireflection layer
- lower antireflection layer—lower matching layer—silver layer—upper matching layer—upper refractive-index-enhancing layer—upper antireflection layer
- lower antireflection layer—lower refractive-index-enhancing layer—lower matching layer—silver layer—upper antireflection layer
- lower antireflection layer—lower refractive-index-enhancing layer—lower matching layer—silver layer—upper matching layer—upper antireflection layer
- lower antireflection layer—lower refractive-index-enhancing layer—lower matching layer—silver layer—upper matching layer—upper refractive-index-enhancing layer—upper antireflection layer In an advantageous embodiment of the invention, the reflection coating includes at least one metallic blocking layer. The blocking layer can be arranged below and/or above the silver layer and preferably makes direct contact with the silver layer. The blocking layer is then positioned between the silver layer and the dielectric layer structure. The blocking layer serves as oxidation protection for the silver layer in particular during temperature treatments of the coated pane, as typically occur during bending processes. The blocking layer preferably has a geometric thickness less than 1 nm, for example, 01 nm to 0.5 nm. The blocking layer is preferably based on titanium or a nickel-chromium alloy.

The blocking layer changes the optical properties of the reflection coating only insignificantly and is preferably present in all the embodiments described above. Particularly preferably, the blocking layer is arranged directly above the silver layer, i.e., between the silver layer and the upper dielectric layer structure, where it is particularly effective. This results in the following preferred layer sequences:

- lower antireflection layer—silver layer—blocking layer—upper antireflection layer
- lower antireflection layer—silver layer—blocking layer—upper matching layer—upper antireflection layer
- lower antireflection layer—silver layer—blocking layer—upper matching layer—upper refractive-index-enhancing layer—upper antireflection layer
- lower antireflection layer—lower matching layer—silver layer—blocking layer—upper antireflection layer
- lower antireflection layer—lower matching layer—silver layer—blocking layer—upper matching layer—upper antireflection layer
- lower antireflection layer—lower matching layer—silver layer—blocking layer—upper matching layer—upper refractive-index-enhancing layer—upper antireflection layer
- lower antireflection layer—lower refractive-index-enhancing layer—lower matching layer—silver layer—blocking layer—upper antireflection layer
- lower antireflection layer—lower refractive-index-enhancing layer—lower matching layer—silver layer—blocking layer—upper matching layer—upper antireflection layer
- lower antireflection layer—lower refractive-index-enhancing layer—lower matching layer—silver layer—blocking layer—upper matching layer—upper refractive-index-enhancing layer—upper antireflection layer Optionally, in each case, an additional blocking layer can be arranged directly below the silver layer, i.e., between the silver layer and the lower dielectric layer structure.

The functional coating contains, above and below the electrically conductive layer based on silver, independently of one another in each case, a dielectric layer module with a refractive index of at least 1.9. In the case of a functional coating with multiple silver layers, all dielectric layer modules preferably have a refractive index of at least 1.9. The dielectric layers contained in the dielectric layer module can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron.

The optical thickness of the uppermost dielectric layer module is preferably from 70 nm to 200 nm, particularly preferably from 80 nm to 100 nm. The optical thickness of the lowest dielectric layer module is preferably from 70 nm to 100 nm, particularly preferably from 80 nm to 150 nm. Good results are achieved with this. The optical thickness of the middle dielectric layer modules is preferably 100 nm to 400 nm, preferably from 150 nm to 300 nm, particularly preferably from 160 nm to 200 nm.

In an advantageous embodiment, a dielectric layer, which can be referred to as an antireflection layer and is preferably based on an oxide, for example, tin oxide, and/or a nitride, for example, silicon nitride, particularly preferably based on silicon nitride, is arranged in each case in the functional coating in the uppermost and lowest layer module and, if present, in the middle layer modules. Silicon nitride has proven to be a good choice due to its optical properties, its easy availability, and its high mechanical and chemical stability. The silicon is preferably doped, for example, with aluminum or boron.

In the case of the uppermost and lowest layer module, the layer based on silicon nitride is preferably the uppermost layer of the uppermost layer module or the lowest layer of the lowest layer module. The geometric thickness of the antireflection layer in the uppermost or lowest layer module is preferably from 10 nm to 50 nm, particularly preferably from 15 nm to 40 nm, in particular from 20 nm to 35 nm. The geometric thickness of the antireflection layer in a middle layer module is preferably from 30 nm to 100 nm, particularly preferably from 40 nm to 80 nm, in particular from 50 nm to 70 nm.

In addition to the antireflection layer, further dielectric layers with a refractive index of at least 1.9 can optionally be present in the dielectric layer modules of the functional layer. Thus, the uppermost and the lowest dielectric layer module can, independently of one another, contain a matching layer to improve the reflectivity of the silver layer. The middle layer modules can, independently of one another, contain one or two matching layers. The matching layers are preferably based on zinc oxide, particularly preferably zinc oxide $ZnO_{1-\delta}$ with $0 \leq \delta \leq 0.01$. The matching layers further preferably contain dopants. The matching layers can, for example, contain aluminum-doped zinc oxide (ZnO:Al). The zinc oxide is preferably deposited substoichiometrically in terms of oxygen in order to avoid reaction of excess oxygen with the silver-containing layer. The matching layers are, in the uppermost and lowest dielectric layer module, preferably arranged between the silver layer and the antireflection layer. The matching layers are, in the middle dielectric layer modules, preferably arranged between the adjacent silver layers and the antireflection layer. The geometric thickness of the matching layer is preferably from 5 nm to 30 nm, particularly preferably from 8 nm to 12 nm.

Refractive-index-enhancing layers that have a higher refractive index than the antireflection layer can also be present in the functional coating, likewise independently of one another, in the uppermost, lowest, and, optionally, middle dielectric layer module. This can further improve and fine-tune the optical properties. The refractive-index-enhancing layers preferably contain a mixed silicon-metal nitride, such as mixed silicon-zirconium nitride, mixed silicon-aluminum nitride, mixed silicon-titanium nitride, or mixed silicon-hafnium nitride, particularly preferably mixed silicon-zirconium nitride. The proportion of zirconium is preferably between 15 and 45 wt.-%, particularly preferably between 15 and 30 wt.-%. Alternative materials can be, for example, $WO_2$, $Nb_2O_5$, $Bi_2O_3$, $TiO_2$, and/or AlN. The refractive-index-enhancing layers are preferably arranged between the antireflection layer and the silver layer or between the matching layer (if present) and the antireflection layer. The geometric thickness of the refractive-index-enhancing layer is preferably from 5 nm to 30 nm, particularly preferably from 5 nm to 15 nm.

In a preferred embodiment of the invention, the lowest layer module in the functional coating consists of exactly one lower dielectric layer with a refractive index of at least 1.9, preferably based on silicon nitride. Likewise, the uppermost layer module consists of exactly one upper dielectric layer module with a refractive index of at least 1.9, preferably based on silicon nitride. The functional coating preferably does not contain any other dielectric layers. The geometric thickness of the antireflection layer in the uppermost and lowest layer module is preferably from 10 nm to 50 nm, particularly preferably from 15 nm to 40 nm, in particular from 20 nm to 35 nm. The geometric thickness of the antireflection layer in the middle dielectric layer module is preferably from 50 nm to 100 nm, particularly preferably from 55 nm to 80 nm, in particular from 60 nm to 70 nm.

In another preferred embodiment of the invention, a first dielectric layer (antireflection layer) and a second dielectric layer (matching layer) are arranged, independently of one another, in the lowest layer module, the uppermost layer module, and the middle layer module of the functional coating. The antireflection and matching layers have a refractive index of at least 1.9. The antireflection layers are preferably based on silicon nitride; the matching layers, on zinc oxide. The matching layers are preferably arranged between the respective antireflection layer and a silver layer. The functional coating preferably does not contain any other dielectric layers.

Particularly preferably, the uppermost and lowest layer module contain an antireflection layer, a matching layer, and no other dielectric layers. The middle layer modules preferably contain a lower matching layer, an antireflection layer, and an upper matching layer in this order and no other dielectric layers. The geometric thickness of the antireflection layer in the uppermost or lowest layer module is preferably from 10 nm to 50 nm, particularly preferably from 15 nm to 40 nm, in particular from 20 nm to 35 nm. The geometric thickness of the antireflection layer in a middle layer module is preferably from 30 nm to 100 nm, particularly preferably from 40 nm to 80 nm, in particular from 50 nm to 70 nm. The geometric thickness of the matching layers is preferably from 5 nm to 30 nm, particularly preferably from 8 nm to 12 nm.

In another preferred embodiment of the invention, a first dielectric layer (antireflection layer), a second dielectric layer (matching layer), and a third dielectric layer (refractive-index-so enhancing layer) are arranged in the functional coating, independently of one another in the lowest layer module and in the uppermost layer module. Preferably, no other dielectric layers are arranged in the lowest and uppermost layer module. A first dielectric layer (matching layer), a second dielectric layer (antireflection layer), and a third dielectric layer (matching layer) are preferably arranged in the middle layer modules. The antireflection and matching layers as well as the refractive-index-enhancing layers have a refractive index of at least 1.9. The refractive-index-enhancing layers have a higher refractive index than the antireflection layers, preferably at least 2.1. The antireflection layers are preferably based on silicon nitride; the matching layers, on zinc oxide; the refractive-index-enhancing layers, on a mixed silicon-metal nitride, such as mixed silicon-zirconium nitride or mixed silicon-hafnium nitride. The matching layers preferably have the least distance from a silver layer, while the refractive-index-enhancing layers are arranged between the matching layers and the antireflection layers. This results in the layer sequence, starting from the substrate, for the uppermost and lowest layer module: (substrate)—antireflection layer—matching layer—refractive-index-enhancing layer—(silver). This results in the layer sequence, starting from a silver layer for the middle layer module: (silver)—matching layer—antireflection layer—matching layer—(silver). The functional coating preferably does not contain any other dielectric layers. The geometric thickness of the antireflection layer in the uppermost or lowest layer module is preferably from 10 nm to 50 nm, particularly preferably from 15 nm to 40 nm, in particular from 20 nm to 35 nm. The geometric thickness of the antireflection layer in a middle layer module is preferably from 30 nm to 100 nm, particularly preferably from 40 nm to 80 nm, in particular from 50 nm to 70 nm. The geometric thickness of the matching layers is preferably from 5 nm to 30 nm, particularly preferably from 8 nm to 12 nm. The geometric thickness of the refractive-index-enhancing layers is preferably from 5 nm to 30 nm, particularly preferably from 5 nm to 15 nm.

Since the individual layer modules can be formed independently of one another, combinations of the above described embodiments are also possible, wherein the uppermost dielectric layer module is formed according to one embodiment and the lowest dielectric layer module is formed according to a different one, and in the case of multiple silver layers, the middle layer module is formed according to another one. This results in the following preferred layer sequences (in each case, starting from the substrate, i.e., the surface on which the functional coating is deposited:

For one silver layer:

lower antireflection layer—silver layer—upper antireflection layer lower antireflection layer—silver layer—upper matching layer—upper antireflection layer lower antireflection layer—silver layer—upper matching layer—upper refractive-index-enhancing layer—upper antireflection layer lower antireflection layer—lower matching layer—silver layer—upper antireflection layer lower antireflection layer—lower matching layer—silver layer—upper matching layer—upper antireflection layer lower antireflection layer—lower matching layer—silver layer—upper matching layer—upper refractive-index-enhancing layer—upper antireflection layer lower antireflection layer—lower refractive-index-enhancing layer—lower matching layer—silver layer—upper antireflection layer lower antireflection layer—lower refractive-index-enhancing layer—lower matching layer—silver layer—upper matching layer—upper antireflection layer lower antireflection layer—lower refractive-index-enhancing layer—lower matching layer—silver layer—upper matching layer—upper refractive-index-enhancing layer—upper antireflection layer For two silver layers, some possibilities are listed by way of example:

lower antireflection layer—silver layer—middle antireflection layer—silver layer—upper antireflection layer lower antireflection layer—lower matching layer—silver layer—middle matching layer—middle antireflection layer—middle matching layer—silver layer—upper matching layer—upper antireflection layer lower antireflection layer—lower matching layer—silver layer—middle matching layer—middle antireflection layer—middle matching layer—silver layer—upper matching layer—upper refractive-index-enhancing layer—upper antireflection layer lower antireflection layer—lower refractive-index-enhancing layer—lower matching layer—silver layer—middle matching layer—middle antireflection layer—middle matching layer—silver layer—upper matching layer—upper refractive-index-enhancing layer—upper antireflection layer lower antireflection layer—lower refractive-index-enhancing layer—silver layer—middle matching layer—middle antireflection layer—silver layer—upper matching layer—upper antireflection layer For three silver layers, analogous structures apply, with, in each case, one silver layer and one additional dielectric layer module added.

In an advantageous embodiment of the invention, the functional coating includes at least one metallic blocking layer. The blocking layer can be arranged below and/or above a silver layer and preferably makes direct contact with the silver layer. Preferably, a blocking layer is arranged below and/or above each silver layer. The blocking layer is then positioned between the silver layer and the dielectric layer module. The blocking layer serves as oxidation protection for the silver layer in particular during temperature treatments of the coated pane, as typically occur during bending processes. The blocking layer preferably has a geometric thickness of less than 1 nm, for example, 0.1 nm to 0.5 nm. The blocking layer is preferably based on titanium or a nickel-chromium alloy.

The blocking layer changes the optical properties of the functional coating only insignificantly and is preferably present in all the embodiments described above. Particularly preferably, the blocking layer is arranged directly above the one/each silver layer, i.e., in each case, between the silver layer and the adjacent upper dielectric layer module, where it is particularly effective.

This results in the following preferred layer sequences for the exemplary layer sequences already listed above:

For one silver layer:

lower antireflection layer—silver layer—blocking layer—upper antireflection layer lower antireflection layer—silver layer—blocking layer—upper matching layer—upper antireflection layer lower antireflection layer—silver layer—blocking layer—upper matching layer—upper refractive-index-enhancing layer—upper antireflection layer lower antireflection layer—lower matching layer—silver layer—blocking layer—upper antireflection layer lower antireflection layer—lower matching layer—silver layer—blocking layer—upper matching layer—upper antireflection layer lower antireflection layer—lower matching layer—silver layer—blocking layer—upper matching layer—upper refractive-index-enhancing layer—upper antireflection layer lower antireflection layer—lower refractive-index-enhancing layer—lower matching layer—silver layer—blocking layer—upper antireflection layer lower antireflection layer—lower refractive-index-enhancing layer—lower matching layer—silver layer—blocking layer—upper matching layer—upper antireflection layer lower antireflection layer—lower refractive-index-enhancing layer—lower matching layer—silver layer—blocking layer—upper matching layer—upper refractive-index-enhancing layer—upper antireflection layer For two silver layers, some possibilities are listed by way of example:

lower antireflection layer—silver layer—blocking layer—middle antireflection layer—silver layer—blocking layer—upper antireflection layer lower antireflection layer—lower matching layer—silver layer—blocking layer—middle matching layer—middle antireflection layer—middle matching layer—silver layer—blocking layer—upper matching layer—upper antireflection layer lower antireflection layer—lower matching layer—silver layer—blocking layer—middle matching layer—middle antireflection layer—middle matching layer—silver layer—blocking layer—upper matching layer—upper refractive-index-enhancing layer—upper antireflection layer lower antireflection layer—lower refractive-index-enhancing layer—lower matching layer—silver layer—blocking layer—middle matching layer—middle antireflection layer—middle matching layer—silver layer—blocking layer—upper matching layer—upper refractive-index-enhancing layer—upper antireflection layer lower antireflection layer—lower refractive-index-enhancing layer—silver layer—blocking layer—middle matching layer—middle antireflection layer—silver layer—blocking layer—upper matching layer—upper antireflection layer For three silver layers, analogous structures apply, with, in each case, one silver layer and one additional dielectric layer module added.

Optionally, in each case, an additional blocking layer can be arranged directly below the/each silver layer, i.e., between the silver layer and the lower dielectric layer module.

In another preferred embodiment, the functional coating is implemented in the form of a multilayer polymeric film. The multilayer polymeric film does not include any electrically conductive layers. Preferably, the multilayer polymeric film includes only polymeric layers. The multilayer polymeric film preferably includes 1 to 1000, particularly preferably 10 to 500, still more preferably 50 to 100 polymeric layers. The multilayer polymeric film reflects IR radiation while it allows visible light to pass through. Thus, the TTS value of the windshield is lowered, whereas the TL value hardly decreases. An additional advantage is that the films cause no shielding of electronic signals of, for example, mobile phones. The multilayer polymeric film can include polymeric layers of different materials. Successive polymeric layers of the multilayer polymeric film preferably differ in their refractive indices such that IR radiation is reflected due to optical interference. Such films are commercially available, for example, from the company 3M under the name UCSF (Ultra-Clear Solar Film). The multilayer polymeric film is preferably provided on a polymeric carrier film. Preferably, the multilayer polymeric film is embedded in the thermoplastic intermediate layer.

In another preferred embodiment, the functional coating is implemented as a coating of nanoparticles. The nanoparticles are applied directly to a pane surface. Preferably, the functional coating includes cesium tungstate nanoparticles and/or indium oxide nanoparticles. Thanks to the discontinuous nanoparticle layer, the glazing has high permeability for high frequencies of, for example, mobile phones. Also, the optical requirements for a windshield can be met, in particular in terms of transparency and coloration. Preferably, the nanoparticles are embedded in a polymer matrix. Suitable mixtures are available commercially, for example, under the name DryWired® Liquid NanoTint®. The polymer matrix with the nanoparticles is created by direct curing on the outer pane. This ensures excellent adhesion. Alternatively, the nanoparticles are preferably embedded in or applied on a polymeric film and are then integrated into the pane during lamination.

The projector is arranged on the interior-side of the windshield and irradiates the windshield via the interior-side surface of the inner pane. It is directed toward the HUD region and irradiates it to generate the HUD projection. According to the invention, the radiation of the projector is predominantly p-polarized, i.e., has a p-polarized radiation component greater than 50%. The higher the proportion of the p-polarized radiation in the total radiation of the projector, the higher the intensity of the desired projection image and the lower the intensity of the undesired reflections on the surfaces of the windshield. The p-polarized radiation component of the projector is preferably at least 70%, particularly preferably at least 80%, and in particular at least 90%. In a particularly advantageous embodiment, the radiation of the projector is essentially purely p-polarized—the p-polarized radiation component is thus 100% or deviates only insignificantly therefrom. The indication of the polarization direction is based on the plane of incidence of the radiation on the windshield. The expression “p-polarized radiation” refers to radiation whose electric field oscillates in the plane of incidence. “S-polarized radiation” refers to radiation whose electric field oscillates perpendicular to the plane of incidence. The plane of incidence is generated by the vector of incidence and the surface normal of the windshield in the geometric center of the irradiated region.

The radiation of the projector preferably strikes the windshield with an angle of incidence from 45° to 70°, in particular from 60° to 70°. In an advantageous embodiment, the angle of incidence deviates from Brewster’s angle by at most 10°. The p-polarized radiation is then reflected only insignificantly at the surfaces of the windshield such that no ghost image is generated. The angle of incidence is the angle between the vector of incidence of the projector radiation and the interior-side surface normal (i.e., the surface normal on the interior-side external surface of the windshield) in the geometric center of the HUD region. Brewster’s angle for an air/glass transition in the case of soda lime glass, which is commonly used for window panes, is 56.5°. Ideally, the angle of incidence should be as close as possible to this Brewster’s angle. However, angles of incidence of 65°, which are common for HUD projection assemblies, are easily implemented in vehicles and deviate only slightly from Brewster’s angle can, for example, also be used such that the reflection of the p-polarized radiation increases only insignificantly.

Since the reflection of the projector radiation occurs substantially at the reflection coating and not at the external pane surfaces, it is not necessary to arrange the external pane surfaces at an angle relative to one another in order to avoid ghost images. The external surfaces of the windshield are, consequently, preferably arranged substantially parallel to one another. The thermoplastic intermediate layer is preferably not implemented wedge-like, but, instead, has a substantially constant thickness, in particular even in the vertical course between the upper 1*c* edge and the lower edge of the windshield, just like the inner pane and the outer pane. A wedge-like intermediate layer would, in contrast, have a variable thickness, in particular an increasing thickness, in the vertical course between the lower edge and the upper edge of the windshield. The intermediate layer is typically formed from at least one thermoplastic film. Since standard films are significantly more economical than wedge films, the production of the windshield is more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colorless, but also tinted or colored. In a preferred embodiment, the total transmittance through the windshield (including the reflection coating and the functional coating) is greater than 70%.

The term “total transmittance” is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

In an advantageous embodiment, the outer pane is tinted or colored. This can reduce the exterior-side reflectivity of the windshield, making the impression of the pane more pleasing for an external viewer. However, in order to ensure light transmittance of preferably at least 70% for windshields (total transmittance), the outer pane should preferably have light transmittance of at least 80%, particularly preferably of at least 85%. Light transmittance describes the proportion of radiation within the visible spectrum in the spectral range from 380 nm to 780 nm transmitted at a transmittance angle of 0°. The light transmittance can be determined by methods known to the person skilled in the art using commercially available measuring instruments, for example, with spectrometers from the company Perkin Elmer. The inner pane and the intermediate layer are preferably clear, i.e., not tinted or colored. For example, green or blue colored glass can be used as the outer pane.

The windshield is preferably curved in one or a plurality of spatial directions, as is customary for motor vehicle panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm. The thermoplastic intermediate layer can consist of a single film or multiple individual films.

The windshield can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflection coating and the functional coating are preferably applied by physical vapor deposition (PVD) onto a pane surface, particularly preferably by cathodic sputtering ("sputtering"), most particularly preferably by magnetron-enhanced cathodic sputtering ("magnetron sputtering"). The coatings are preferably applied before lamination. Instead of applying the reflection coating and/or the functional coating on a pane surface, it can, in principle, also be provided on a carrier film preferably made of polyethylene terephthalate (PET) that is arranged in the intermediate layer.

If the windshield is to be bent, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflection coating.

The invention further includes the use of a projection assembly according to the invention as an HUD in a motor vehicle, in particular in a passenger car or a truck.

In the following, the invention is explained in detail with reference to drawings and exemplary embodiments. The drawings are schematic representations and are not true to scale. The drawings in no way restrict the invention.

Figure 2:
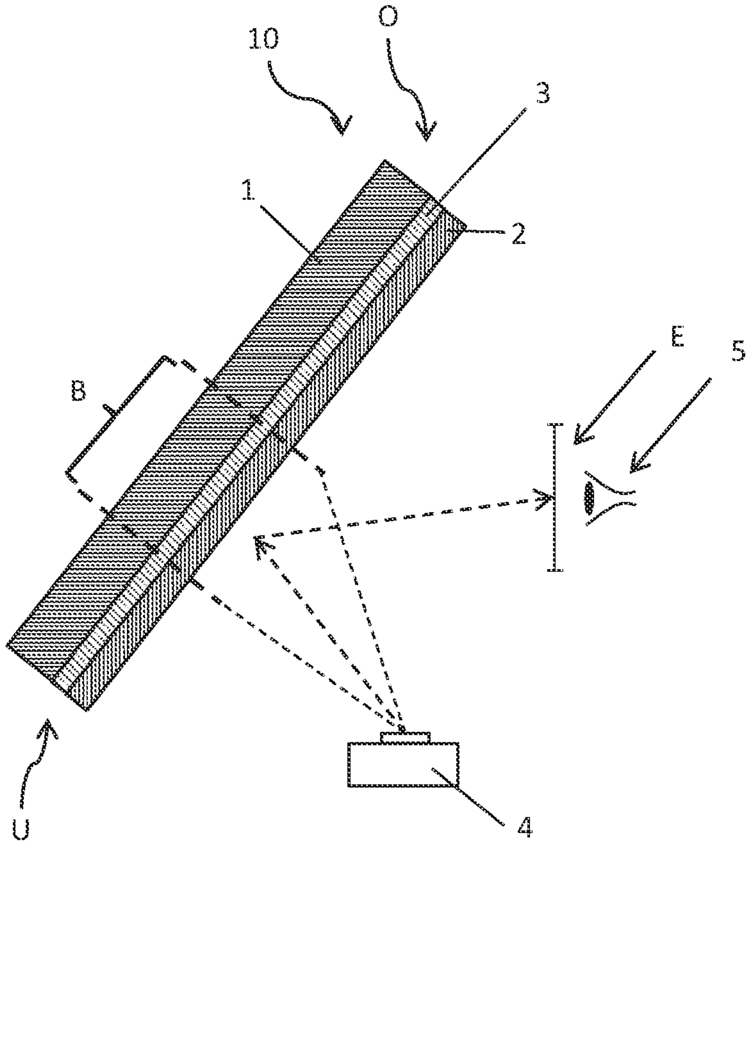
Figure 3:
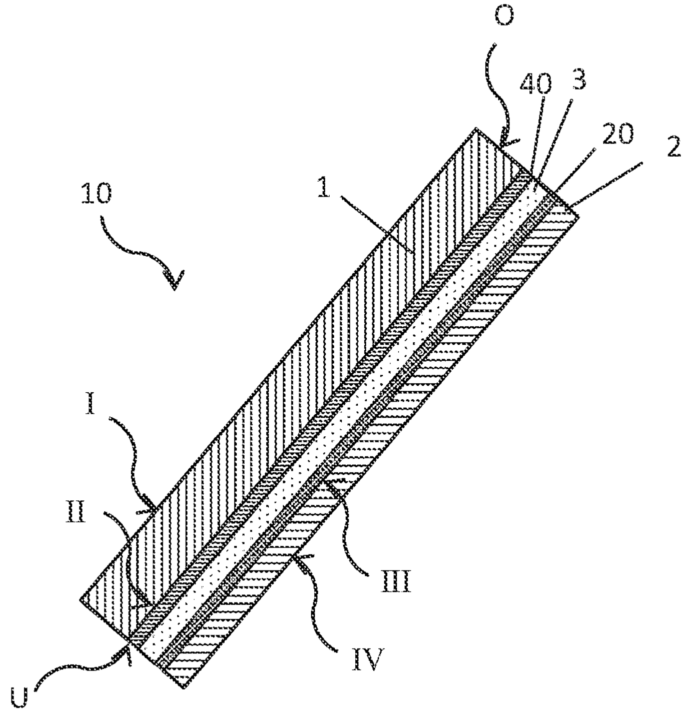
Figure 4:
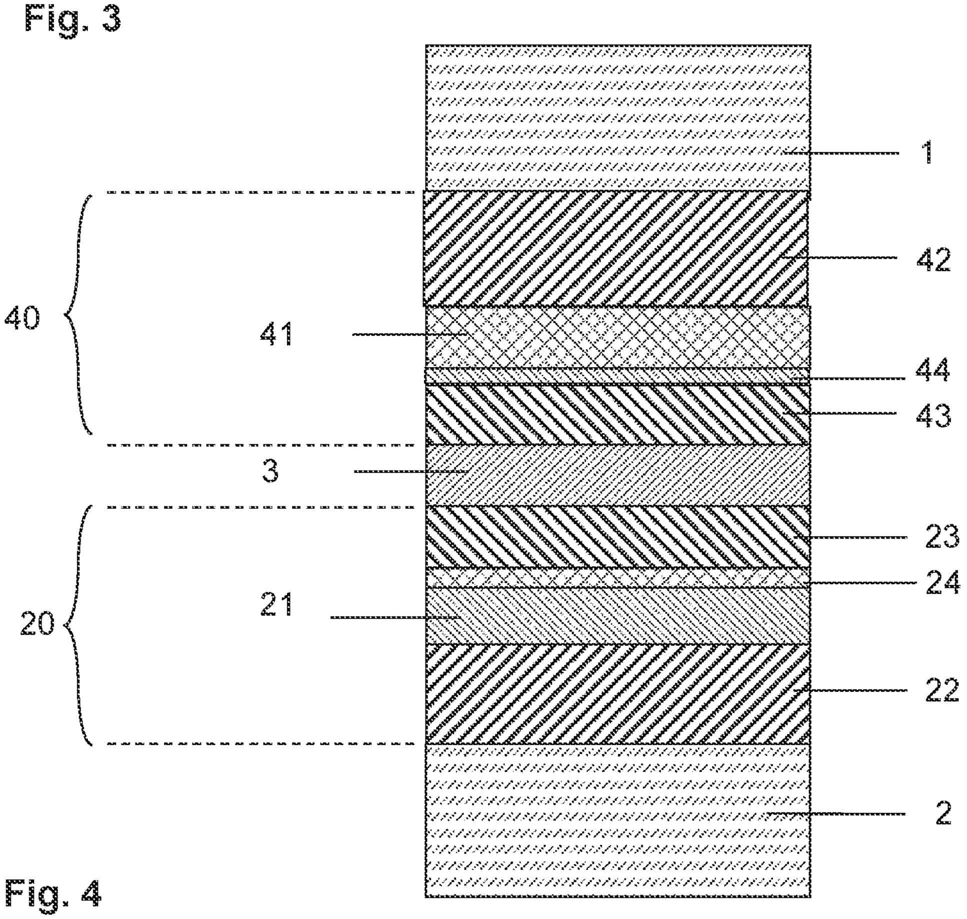
Figure 5A:
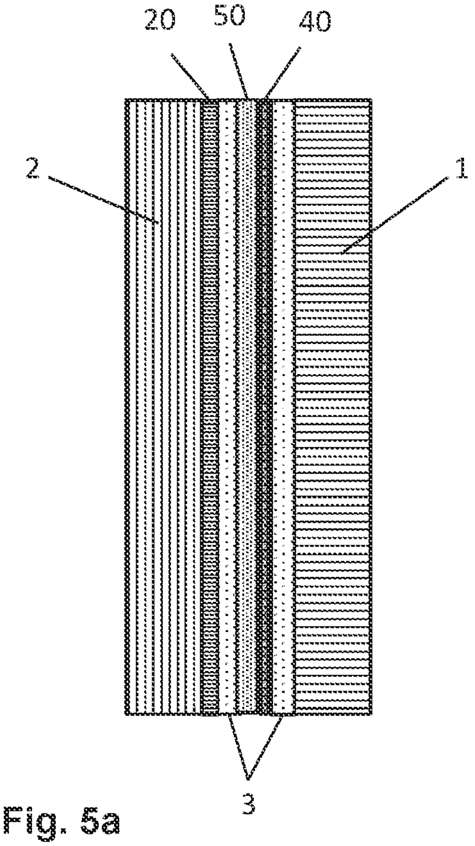
Figure 6:
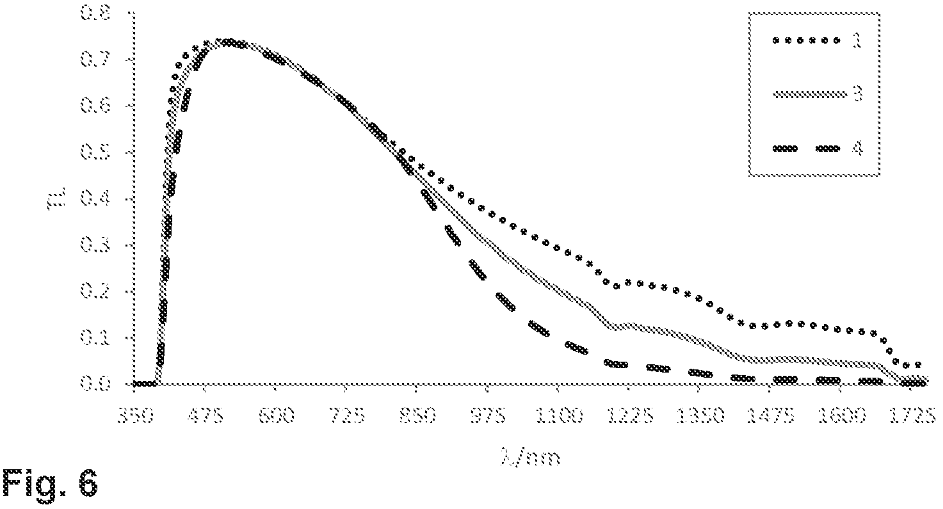

They depict:

FIG. 1 a plan view of a composite pane of a generic projection assembly,

FIG. 2 a cross-section through a generic projection assembly,

FIG. 3 a cross-section through a composite pane of a projection assembly according to the invention, FIG. 4 a cross-section through an embodiment of a windshield for a projection assembly according to the invention, FIG. 5*a,b* in each case, a cross-section through an embodiment of a windshield for a projection assembly according to the invention, FIG. 6 transmittance spectra of Examples 1, 3, and 4.

FIG. 1 and FIG. 2 depict in each case a detail of a generic projection assembly for an HUD. The projection assembly comprises a windshield 10, in particular the windshield of a passenger car. The projection assembly also comprises a projector 4 that is directed at a region of the composite pane 10. In this region, commonly referred to as HUD region B, the projector 4 can generate images that are perceived by a viewer 5 (vehicle driver) as virtual images on the side of the composite pane 10 facing away from him if his eyes are situated within the so-called eyebox E.

The windshield 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the external surroundings; the inner pane 2, the vehicle interior.

FIG. 3 depicts an embodiment of a windshield 10 implemented according to the invention. The outer pane 1 has an outer face I that, in the installed position, faces the external surroundings, and an inner face II that, in the installed position, faces the interior. Likewise, the inner pane 2 has an outer face III that, in the installed position, faces the external surroundings, and an inner face IV that, in the installed position, faces the interior. The outer pane 1 and the inner pane 2 are made, for example, of soda lime glass. The outer pane 1 has, for example, a thickness of 2.1 mm; the inner pane 2, a thickness of 1.6 mm or 2.1 mm. The intermediate layer 3 is made, for example, of a PVB film with a thickness of 0.76 mm. The PVB film has an essentially constant thickness, apart from any surface roughness common in the art—it is not implemented as a so-called "wedge film".

The exterior-side surface III of the inner pane 2 is provided with a reflection coating 20, which is provided as a reflection surface for the projector radiation (and, possibly, additionally, as an IR-reflecting coating).

The radiation of the projector 4 is p-polarized, in particular essentially purely p-polarized. Since the projector 4 irradiates the windshield 10 at an angle of incidence of about 65°, which is close to Brewster's angle, the radiation of the projector is only insignificantly reflected at the external surfaces I, IV of the composite pane 10. In contrast, the reflection coating 20 according to the invention is optimized for reflection of p-polarized radiation. It serves as a reflection surface for the radiation of the projector 4 to generate the HUD projection.

A functional coating 40 according to the invention is arranged on the inner face II of the outer pane 1. The functional coating 40 is optimized for reflection of infrared (IR) radiation and serves to improve the thermal protection function of the windshield. The arrangement on the so inner face II of the outer pane 1 ensures that most of the p-polarized radiation of the projector 4 is already reflected by the reflection coating 20 on the inner pane and can be used to generate the HUD projection. Thus, distracting double images are largely avoided due to the functional coating 40.

Figure 5B:
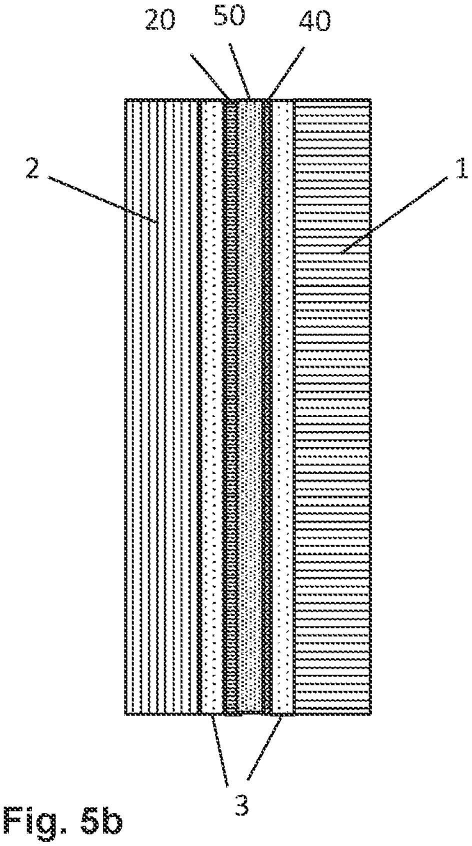

FIG. 5*a* and FIG. 5*b* depict in each case a cross-section through a windshield with a polymeric carrier film. FIG. 5*a* depicts a windshield with a reflection coating 20 according to the invention on the outer face of the inner pane 2. The reflection coating 20 is applied directly on the inner pane 2 by a PVD method, in this case, by magnetron sputtering. The functional coating 40 is arranged on a polymeric carrier film 50 made of PET and embedded in the thermoplastic intermediate layer 3 consisting of two plies of PVB. Since the reflection coating 20 is arranged directly on the inner pane 2, no carrier film or thermoplastic intermediate layer interferes with the generation of the HUD image.

In the embodiment depicted in FIG. 5*b*, the functional coating 40 and the reflection coating 20 are arranged on a single carrier film 50. Thus, at the time of lamination, only one additional carrier film has to be inserted, which is advantageous from a process engineering standpoint.

The distance between the reflection coating 20 and the functional coating 40 is defined here only by the carrier film 50. Thus, the generation of distracting ghost images due to the functional coating 40 is particularly efficiently avoided, because any reflections at the functional coating are superimposed with those at the reflection coating and become one image. Thus, any reflections at the functional coating are not perceived as a distracting double image when an HUD image is generated.

FIG. 4 depicts the layer sequence of an embodiment of a windshield 10 according to the invention. According to the invention, the reflection coating 20 is arranged on the outer face of the inner pane 2 in the form of a stack of thin layers. The reflection coating 20 includes one electrically conductive layer 21 based on silver. A metallic blocking layer 24 is arranged directly above the electrically conductive layer 21. An upper dielectric layer structure 23 is arranged above that. A lower dielectric layer structure 22 is arranged below the electrically conductive layer 21.

According to the invention, a functional coating 40 is arranged on the inner face of the outer pane 1 in the form of a stack of thin layers. The functional coating 40 includes one electrically conductive layer 41 based on silver. A metallic blocking layer 44 is arranged directly above the electrically conductive layer 41. An uppermost dielectric layer module 43 is arranged above that. A lowest dielectric layer module 42 is arranged below the electrically conductive layer 41.

The inner pane 2 and the outer pane 1 are joined via a thermoplastic intermediate layer 3.

The layer thicknesses shown are not to scale. For example, the thickness of the panes 1 and 2 and the thickness of the thermoplastic intermediate layer 3 are much too small compared to the thin layers shown. In addition, the structure shown is provided merely by way of example. The blocking layers can be present or not and can be arranged above and/or below the electrically conductive layers. The dielectric layer structures and layer modules can in each case include a single dielectric layer or also multiple layers, provided at least one dielectric layer is present above and below the conductive layers 21 and 41. Exemplary materials and layer thicknesses can be found in the following examples.

Tables 1 and 2 present the layer sequences of a windshield 10 with a reflection coating 20 on the outer face of the inner pane and a functional coating 40 on the inner face of the outer pane according to Examples 1 through 6 according to the invention, together with the materials and geometric layer thicknesses of the individual layers. Independently of one another, the dielectric layers can be doped, for example, with boron or aluminum.

TABLE 1

| Material | | Layer Thickness | | | |
|---|---|---|---|---|---|
| | | Example 4 | Example 3 | Example 2 | Example 1 |
| Soda lime glass | | 2.1 mm | 2.1 mm | 2.1 mm | 2.1 mm |
| SiN | Lowest | 25 nm | 25 nm | 25 nm | 20 nm |
| SiZrN | dielectric layer | 10 nm | 10 nm | 10 nm | 10 nm |
| ZnO | module | 10 nm | 10 nm | 10 nm | 10 nm |
| Ag | 1st silver layer | 8 nm | 8 nm | 11 nm | 10 nm |
| NiCr | Blocking layer | 0.3 nm | 0.3 nm | 0.3 nm | 0.3 nm |
| ZnO | Middle | 10 nm | 10 nm | | |
| SiN | dielectric layer | 70 nm | 70 nm | | |
| ZnO | module | 10 nm | 10 nm | | |
| Ag | 2nd silver layer | 9 nm | 8 nm | | |
| NiCr | Blocking layer | 0.3 nm | 0.3 nm | | |
| ZnO | Middle | 10 nm | | | |
| SiN | dielectric layer | 70 nm | | | |
| ZnO | module | 10 nm | | | |
| Ag | 3rd silver layer | 8 nm | | | |
| NiCr | Blocking layer | 0.3 nm | | | |
| ZnO | Uppermost | 10 nm | 10 nm | 10 nm | 10 nm |
| SiZrN | dielectric layer | 10 nm | 10 nm | 10 nm | 10 nm |
| SiN | module | 25 nm | 20 nm | 25 nm | 25 nm |
| PVB | | 0.76 mm | 0.76 mm | 0.76 mm | 0.76 mm |
| SiN | Upper | 30 nm | 30 nm | 30 nm | 40 nm |
| SiZrN | dielectric layer | 10 nm | 10 nm | 10 nm | 10 nm |
| ZnO | structure | 10 nm | 10 nm | 10 nm | 10 nm |
| NiCr | Blocking layer | 0.3 nm | 0.3 nm | 0.3 nm | 0.3 nm |
| Ag | Silver | 11.0 nm | 12 nm | 12 nm | 12 nm |
| ZnO | Lower dielectric layer | 10.0 nm | 10 nm | 10 nm | 10 nm |
| SiN | structure | 20 nm | 20 nm | 20 nm | 27 nm |
| Soda lime glass | | 2.1 mm | 2.1 mm | 2.1 mm | 2.1 mm |

TABLE 2

| Material | | Layer Thickness | | |
|---|---|---|---|---|
| | | Example 5 | Example 6 | Comp. Ex. |
| Soda lime glass | | 2.1 mm | 2.1 mm | 2.1 mm |
| SiN | Lowest | 40 nm | 20 nm | |
| SiZrN | dielectric | 10 nm | 10 nm | |
| ZnO | layer module | 10 nm | 10 nm | |
| Ag | 1st silver layer | 10 nm | 10 nm | |
| NiCr | Blocking layer | 0.3 nm | 0.3 nm | |
| ZnO | Uppermost | 10 nm | 10 nm | |
| SiZrN | dielectric | 10 nm | 10 nm | |
| SiN | layer module | 30 nm | 45 nm | |
| PVB | | 0.76 mm | 0.76 mm | 0.76 mm |
| SiN | Upper | 30 nm | 30 nm | 40 nm |
| SiZrN | dielectric | 10 nm | 10 nm | 10 nm |
| ZnO | layer structure | 10 nm | 10 nm | 10 nm |

TABLE 2-continued

| Material | | Layer Thickness Example 5 | Example 6 | Comp. Ex. |
|---|---|---|---|---|
| NiCr | Blocking layer | 0.3 nm | 0.3 nm | 0.3 nm |
| Ag | Silver | 12 nm | 12 nm | 12 nm |
| ZnO | Lower | 10.0 nm | 10 nm | 10 nm |
| SiN | dielectric | 20 nm | 20 nm | 27 nm |
| Soda lime glass | layer structure | 2.1 mm | 2.1 mm | 2.1 mm |

The optical thicknesses of the upper and lower layer structures and their ratio are summarized in Table 3. The ratio ϕ describes the ratio of the optical thickness of the upper dielectric layer structure 23 to the optical thickness of the lower dielectric layer structure 22.

The optical thickness is in each case the product of the geometric thickness shown in Tables 1 and 2 and the refractive index (SiN: 2.0; SiZrN: 2.2, ZnO: 2.0).

TABLE 3

| | Optical Thickness of the Upper Dielectric Layer Structure | Optical Thickness of the Lower Dielectric Layer Structure | Ratio ϕ |
|---|---|---|---|
| Example 1 | 122 | 74 | 1.65 |
| Example 2 | 102 | 60 | 1.70 |
| Example 3 | 102 | 60 | 1.70 |
| Example 4 | 102 | 60 | 1.70 |
| Example 5 | 102 | 60 | 1.70 |
| Example 6 | 102 | 60 | 1.70 |
| Comparative Example | 122 | 74 | 1.65 |

The optical thicknesses of the uppermost and lowest layer modules and their ratio are summarized in Table 4. The ratio γ describes the ratio of the optical thickness of the uppermost dielectric layer module 43 to the optical thickness of the lowest dielectric layer module 42.

TABLE 4

| | Optical Thickness of the Uppermost Dielectric Layer Module | Optical Thickness of the Lowest Dielectric Layer Module | Ratio γ |
|---|---|---|---|
| Example 1 | 92 | 82 | 1.12 |
| Example 2 | 92 | 92 | 1.00 |
| Example 3 | 82 | 92 | 0.89 |
| Example 4 | 92 | 92 | 1.00 |
| Example 5 | 122 | 102 | 0.84 |
| Example 6 | 82 | 132 | 1.61 |
| Comparative Example | 0 | 0 | 0 |

The optical thicknesses of the uppermost, middle, and lowest layer modules and their ratio are summarized in Table 5. The ratio η1 describes the ratio of the optical thickness of the middle dielectric layer module to the optical thickness of the uppermost dielectric layer module. The ratio η2 describes the ratio of the optical thickness of the middle dielectric layer module to the optical thickness of the lowest dielectric layer module 42.

TABLE 5

| | Optical Thickness of the Uppermost Dielectric Layer Module | Optical Thickness of the Lowest Dielectric Layer Module | Optical Thickness of the Middle Dielectric Layer Module | Ratio η1 | Ratio η2 |
|---|---|---|---|---|---|
| Example 3 | 82 | 92 | 180 | 1.96 | 1.96 |
| Example 4 lowest module | 92 | 92 | 180 | 2.20 | 1.96 |

Table 6 indicates the values for transmittance in accordance with illuminant A. In addition, the values for thermal comfort in the form of the TTS value. This indicates the total solar energy transmitted and is measured according to ISO 13837.

TABLE 6

| | Transmittance TL A/% | TTS/% |
|---|---|---|
| Example 1 | 71 | 54.0 |
| Example 2 | 71 | 52.3 |
| Example 3 | 72 | 51.5 |
| Example 4 | 71 | 49.1 |
| Example 5 | 70 | 53.0 |
| Example 6 | 69 | 52.8 |
| Comparative Example | 76 | 61.3 |

The Comparative Example listed in Table 2 differs from the Examples in that the windshield has no functional coating. The windshield does have, thanks to the reflection coating on the inner pane, good reflection properties for HUD image generation. However, the pane of the Comparative Example has poor thermal insulation properties, as the high TTS value shows. Examples 1 and 3 show, in comparison to the Comparative Example, a significantly lowered TTS value and thus have an improved thermal protection effect. Thanks to the reflection coating according to the invention for reflecting p-polarized radiation, the windshields according to the invention are ideally suited for use in an HUD projection assembly.

Examples 1 to 6 are all suitable as projection surfaces for HUD image generation with p-polarized radiation. Thanks to the configuration according to the invention with thinner silver layers in the functional coating than in the reflection coating, no distracting double images develop due to reflection at the electrically conductive layers of the functional coating.

All Examples 1 to 6 have a ratio $ of at least 1.6. This ensures a color-neutral display of the HUD projection.

Examples 5 and 6 differ from Examples 1 and 2 primarily in the ratio γ of the optical thicknesses of the uppermost dielectric layer module to the optical thickness of the lowest dielectric layer module. While the value for Examples 1 and 2 is between 0.9 and 1.1, that for Examples 5 and 6 is below and above, respectively. Surprisingly, this leads to improved transmittance values of 71 for Examples 1 and 2.

FIG. 6 depicts three transmittance spectra for Examples 1, 3, and 4, whose structure is listed in Table 1. The spectra were recorded under identical conditions such that a direct comparison 2*o* is possible. It can be seen that all Examples 1, 3, and 4 have very similar transmittance in the visible (VIS) spectral range (400 nm to 800 nm). As listed in Table 6, all Examples 1, 3, and 4 have a TL value for illuminant A of at least 70%. These are thus well suited as a windshield or as a front side window in the automotive sector.

The glazing according to Example 4 exhibits the best thermal protection effect, as indicated so by the low TTS value (Table 6) and the low transmittance in the infrared (IR) range (800 nm-2500 nm).

As a comparison of the spectra in FIG. 6 shows, the TL value decreases with the increasing number of silver layers in the functional coating. Thanks to the structure according to the invention, high transmittance in the visible spectral range can nevertheless be achieved, such that use as a windshield is possible. Table 5 shows the values for the ratios $\eta 1$ and $\eta 2$, which indicate the ratio of the optical thickness of the middle dielectric layer module to the optical thickness of the uppermost and lowest dielectric layer module, respectively. The middle dielectric layer modules have a substantially greater optical thickness than the lowest or the uppermost layer modules, respectively. Surprisingly, it has been shown that this ratio results in comparatively high TL values, even though the layer stack of the functional coating includes multiple silver layers.

LIST OF REFERENCE CHARACTERS

1 outer pane
2 inner pane
3 thermoplastic intermediate layer
4 projector
5 viewer/vehicle driver
10 windshield
20 reflection coating
21 electrically conductive layer based on silver in the reflection coating
22 lower dielectric layer structure in the reflection coating
23 upper dielectric layer structure in the reflection coating
24 blocking layer
40 functional coating
41 electrically conductive layer based on silver in the functional coating
42 lowest dielectric layer module
43 uppermost dielectric layer module
44 metallic blocking layer
50 polymeric carrier film
O upper edge of the windshield 10
U lower edge of the windshield 10
B HUD region of the windshield 10
E eyebox
I exterior-side surface of the outer pane 1, facing away from the intermediate layer 3, outer face of the outer pane 1
II interior-side surface of the outer pane 1, facing the intermediate layer 3, inner face of the outer pane 1
III exterior-side surface of the inner pane 2, facing the intermediate layer 3, outer face of the inner pane 2
IV interior-side surface of the inner pane 2, facing away from the intermediate layer 3, inner face of the inner pane 2

The invention claimed is:

1. A projection assembly for a head-up display (HUD), comprising a windshield, comprising an outer pane and an inner pane that are joined to one another via a thermoplastic intermediate layer, with an HUD region; and a projector, which is directed at the HUD region, wherein a radiation of the projector is predominantly p-polarized; and a reflection coating that is adapted to reflect p-polarized radiation, wherein the reflection coating contains exactly one electrically conductive layer based on silver, the reflection coating below the electrically conductive layer comprises a lower dielectric layer structure with a refractive index of at least 1.9, the reflection coating above the electrically conductive layer comprises an upper dielectric layer structure with a refractive index of at least 1.9; and a functional coating that is suitable for reflecting IR radiation, wherein the functional coating and the reflection coating are arranged between the inner pane and the outer pane, wherein the reflection coating is arranged between the inner pane and the functional coating.

2. The projection assembly according to claim 1, wherein in the reflection coating, a ratio of an optical thickness of the upper dielectric layer structure to an optical thickness of the lower dielectric layer structure is at least 1.6.

3. The projection assembly according to claim 2, wherein in the reflection coating, the ratio of the optical thickness of the upper dielectric layer structure to the optical thickness of the lower dielectric layer structure is at least 1.8.

4. The projection assembly according to claim 1, wherein the functional coating contains at least one electrically conductive layer based on silver, with a geometric thickness smaller than a geometric thickness of the electrically conductive layer based on silver in the reflection coating, the functional coating below the electrically conductive layer based on silver includes a lowest dielectric layer module with a refractive index of at least 1.9, and the functional coating above the electrically conductive layer based on silver includes an uppermost dielectric layer module with a refractive index of at least 1.9.

5. The projection assembly according to claim 1, wherein in the functional coating, a ratio of an optical thickness of the uppermost dielectric layer module to an optical thickness of the lowest dielectric layer module is between 0.8 and 1.5.

6. The projection assembly according to claim 5, wherein in the functional coating, the ratio of the optical thickness of the uppermost dielectric layer module to the optical thickness of the lowest dielectric layer module is between 0.9 and 1.2.

7. The projection assembly according to claim 1, wherein the functional coating contains two electrically conductive layers based on silver and a middle dielectric layer module therebetween, wherein a geometric thickness of all electrically conductive layers based on silver in the functional coating is smaller than a geometric thickness of the electrically conductive layer based on silver in the reflection coating.

8. The projection assembly according to claim 7, wherein in the functional coating, a ratio of an optical thickness of the middle dielectric layer module to the optical thickness of the lowest dielectric layer module and to an optical thickness of the uppermost dielectric layer module is greater than 1.9.

9. The projection assembly according to claim 8, wherein in the functional coating, the ratio of the optical thickness of the middle dielectric layer module to the optical thickness of the lowest dielectric layer module and to the optical thickness of the uppermost dielectric layer module is greater than 2.1.

10. The projection assembly according to claim 1, wherein the reflection coating is arranged on an outer face of the inner pane facing the thermoplastic intermediate layer.

11. The projection assembly according to claim 1, wherein the functional coating is arranged on an inner face of the outer pane facing the thermoplastic intermediate layer.

12. The projection assembly according to claim 1, wherein the functional coating or the reflection coating is arranged on a polymeric carrier film, which is embedded in the thermoplastic intermediate layer.

13. The projection assembly according to claim 1, wherein the functional coating and the reflection coating are arranged on a single polymeric carrier film, wherein the polymeric carrier film is embedded in the thermoplastic intermediate layer.

14. The projection assembly according to claim 1, wherein in the reflection coating the lower layer structure comprises a first lower dielectric layer and a second lower dielectric layer, and/or the upper layer structure comprises a first upper dielectric layer and a second upper dielectric layer with a refractive index of at least 1.9.

15. The projection assembly according to claim 1, wherein the reflection coating and the functional coating include in each case at least one metallic blocking layer based on titanium or a nickel-chromium alloy, which is arranged above and/or below at least one electrically conductive layer and has a geometric thickness of less than 1 nm.

16. The projection assembly according to claim 1, wherein all dielectric layers of the reflection coating have a refractive index of at least 1.9.

17. The projection assembly according to claim 1, wherein in the reflection coating, the electrically conductive layer has a geometric thickness of 10 nm to 14 nm.

18. The projection assembly according to claim 1, wherein the functional coating is connected to a voltage source via electrical bus bars and is heatable by applying a voltage.

19. The projection assembly according to claim 1, wherein the functional coating is implemented in the form of a multilayer polymeric film without electrically conductive layers.

20. The projection assembly according to claim 1, wherein the radiation of the projector is substantially purely p-polarized and strikes the windshield at an angle of incidence of 60° to 70°.

21. The projection assembly according to claim 1, wherein the reflection coating and the functional coating are out of direct contact with each other and are separated from each other by one or more thermoplastic films of the thermoplastic intermediate layer, by a polymeric carrier film on which at least one of the reflection coating or the functional coating is arranged within the thermoplastic intermediate layer, or by a combination thereof.

* * * * *